United States Patent [19]
Weinstein et al.

[11] 3,793,504
[45] Feb. 19, 1974

[54] METHOD AND SYSTEM FOR GENERATING DATA SIGNALS

[75] Inventors: Berel Weinstein, New York, N.Y.; Henry T. Goldbach, Little Ferry; Mark J. Kolby, Maywood, both of N.J.

[73] Assignee: Bio Medical Sciences, Inc., Fairfield, N.J.

[22] Filed: July 13, 1971

[21] Appl. No.: 162,133

[52] U.S. Cl......... 235/92 MT, 235/92 R, 235/92 V, 235/61.6 E
[51] Int. Cl. .......................................... G06m 1/272
[58] Field of Search....... 235/92 MT, 61.6 E, 92 TC

[56] References Cited
UNITED STATES PATENTS

| | | | |
|---|---|---|---|
| 3,301,058 | 1/1967 | Roberts | 235/92 MT |
| 3,619,569 | 11/1971 | Hoehn | 235/61.6 E |
| 3,350,547 | 10/1967 | Brockett | 235/92 TC |

*Primary Examiner*—Paul J. Henon
*Assistant Examiner*—Robert F. Gnuse
*Attorney, Agent, or Firm*—Watson, Leavenworth, Kelton & Taggart

[57] ABSTRACT

A method and system for generating signals indicative of data concerning environmental characteristics. A detector is provided incorporating a plurality of detecting elements, each having a predetermined threshold level and thus selectively capable of providing a sensible indication of the presence of an environmental characteristic of magnitude equal to or greater than such threshold level. The detecting elements are correlated in respect of their threshold levels with a preselected numerical scale whose digits define discrete magnitudes of environmental characteristics. After exposure to the environment, the detector is sensed and the number of its sensible indicia is counted. A signal indicative of such sensible indicia count and hence correlated with the numerical scale is provided.

10 Claims, 4 Drawing Figures

PATENTED FEB 19 1974 3,793,504

METHOD AND SYSTEM FOR GENERATING DATA SIGNALS

FIELD OF THE INVENTION

This invention pertains to methods and systems for use in environmental characteristic detection and measurement.

BACKGROUND OF THE INVENTION

In medical and like diagnosis, and particularly in computer-associated medical diagnosis, it is frequently requisite in enabling information processing, to provide digital signals indicative of measurable environmental characteristics, such as body temperature, glucose, albumen and the like. Typically, such information is derived from the environment by analog sensors providing a visual indication thereof or providing electrical signals having magnitude, phase or frequency indicative thereof. The collected information is then encoded in desired format, i.e., is digitized, to provide bilevel signals.

Such digital data signal generation is evidently inefficient, particularly by reason of the need for the step of digitizing analog information and the need for digitizing apparatus. In addition, in the absence of sophisticated analog sensor apparatus of exceptional linearity and in the absence of quite sophisticated analog to digital conversion apparatus, there remain the possibility of inaccuracy in deriving information from the environment and the loss of accuracy in the transition from analog to digital information.

In light of these shortcomings in respect of both efficiency and accuracy, substantial need presently exists for methodology and systems of improved character for the furtherance of computer-associated diagnosis.

SUMMARY OF THE INVENTION

It is an object of this invention to provide improved methods and systems for use in generating digital data signals indicative of environmental characteristics.

It is a more particular object of the invention to provide improved methods and systems for generating digital data signals indicative of body characteristics for use in medical diagnosis.

In the efficient attainment of these and other objects, the present invention provides a method wherein information regarding characteristics of an environment is derived by subjecting to the environment a detector incorporating a plurality of detecting elements, each having a distinct threshold level for detecting an environmental characteristic magnitude correlative with a digit of a preselected scale of environmental characteristic magnitudes of interest. Each detecting element is adapted to provide a sensible indicium when the environmental characteristic attains or exceeds the detecting element threshold level. Upon determining the cumulative indicia-providing response of the detector at large to an environment, e.g., by sensing each sensible indicium and counting the number of indicia, a digital signal correlated to said scale and hence indicative of environmental characteristic data, is provided.

The systems of the invention provide implementation of the foregoing steps by incorporating detector apparatus, apparatus for irradiating the detector after its exposure to the environment, apparatus for collecting radiation reflected from the detector and analyzing the same for sensible indicia content, apparatus for counting sensible indicia and apparatus for generating signals indicative of such count and hence the magnitude of environmental characteristics.

In the methods and systems of the invention, the positive step of and apparatus for digitizing time-varying analog signals is eliminated, thereby simplifying and economizing signal generation.

The foregoing and other objects and features of the invention will be evident from the following detailed description thereof taken in conjunction with the drawings.

DETAILED DESCRIPTION OF THE PREFERRED EMBODIMENTS

Figure 1:
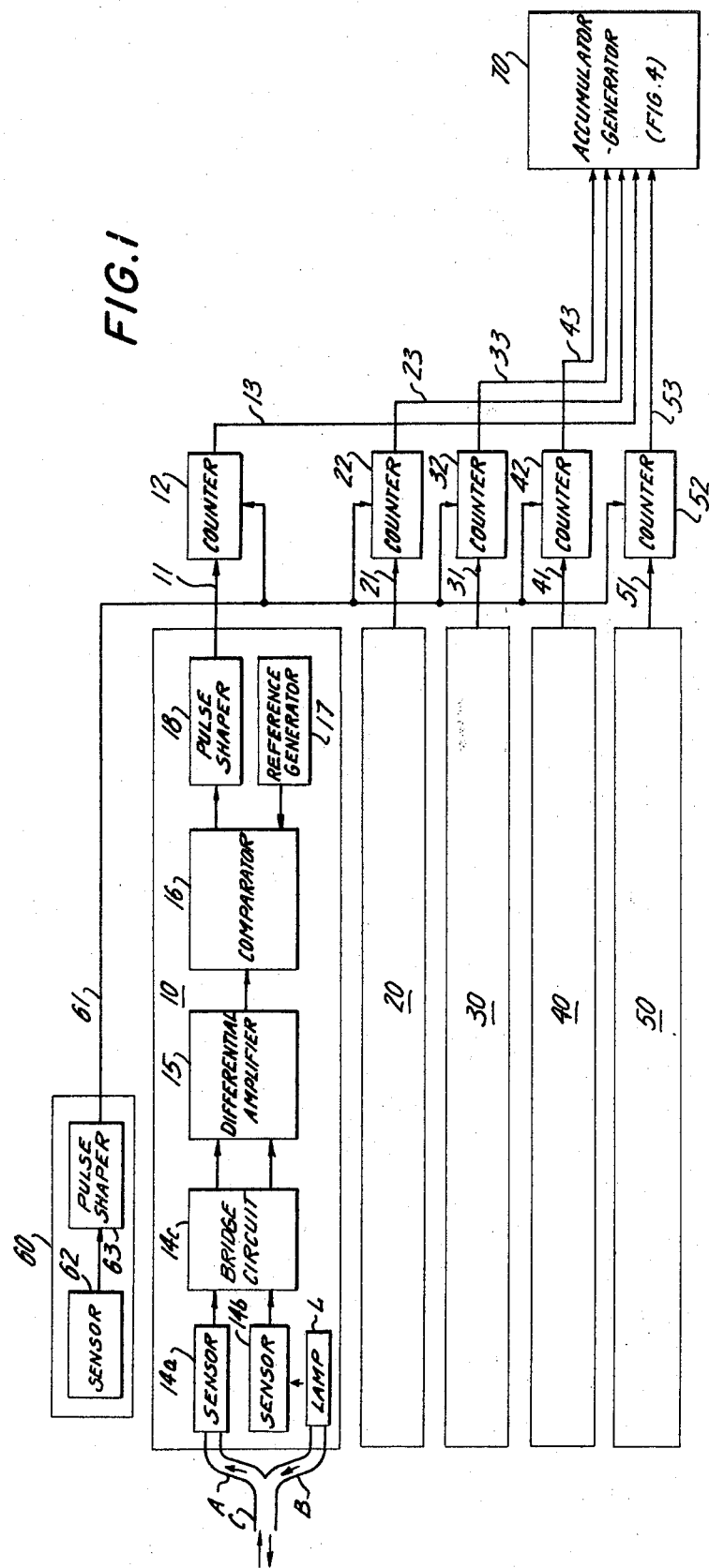
FIG. 1 is a block diagrammatic illustration of the system of the invention.

For convenience in explaining the methods and systems of the invention, reference will be made initially to FIG. 2. Therein, detector 1, in this instance a thermometer, includes portion 2 adapted for exposure to an environment under study, in the exemplary instance, a human mouth, for purposes of measuring environmental characteristics, e.g., oral temperature magnitude. In portion 2, the detector incorporates a plurality of individual detecting elements disposed in cavities 3 and preferably arranged in grid or matrix format for convenience in examining sensible indicia provided by the detector after being subjected to an environment. Each cavity is filled with a composition 4, which is responsive to the presence of a predetermined characteristic in the environment to bring about a sensible change in itself or in layer 6 disposed immediately thereabove on carrier sheet 5. In the exemplary instance, the composition 4 filling each cavity 3 is a thermally-responsive composition having a singular thermal characteristic, e.g., melting point (incipient fusion temperature) different from the thermal characteristic of compositions 4 in all other cavities. Carrier sheet 5 is comprised of flexible, heat conductive material, such as an aluminum foil, to insure rapid heat transfer from the test environment to the thermally-responsive compositions disposed in the cavities of the carrier sheet. Layer 6 is preferably adapted to provide a sensible indicium, e.g., color change, upon melting of composition 4. A masking layer 7 may overlie layer 6 and the detector assembly is preferably enclosed by protective transparent layer 8 and undercover layer 9.

The initial step in practicing the methods of the invention involves the preselection of a numerical scale of digits, $n$, $n-l$, ... $n-k$, for defining a succession of $n$, $n-l$, ... $n-k$ correlative discrete magnitudes of the environmental characteristic of interest. In the exemplary instance, a scale of numeric one through numeric 45 is selected and the same defines a succession of 45 temperature increments, each of 0.2°F., between 96.0°F. and 104.8°F., as illustrated in FIG. 2. For convenience, the FIG. 2 grid detector bears actual labeling of such scale and provides for graduated positioning of the individual detecting elements. However, such labeling and graduated positioning is not a requisite as respects practice under the present invention.

Upon completion of this initial step, the detector is provided by arranging a plurality of detecting elements, each having a distinct threshold level for detecting environmental characteristic magnitude and each providing a sensible indicium upon being subjected to an environment having characteristic magnitude equal to or greater than the detecting element threshold level. In the exemplary instance, the detecting elements may be provided by placing the following listed temperature-dependent compositions 4 in identified ratio in cavities 3. The detecting elements are identified by their individual correlation with the preselected numeric scale (one through 45) and by their temperature magnitude threshold levels.

TABLE

COMPOSITION IN WEIGHT PERCENT

| Detecting Element | Temp. °F | Ortho-Bromonitro-Benzene | Ortho-Chloronitro-Benzene |
|---|---|---|---|
| 1 | 96.0 | 56.2 | 43.8 |
| 2 | 96.2 | 57.5 | 42.5 |
| 3 | 96.4 | 58.8 | 41.2 |
| 4 | 96.6 | 60.1 | 39.9 |
| 5 | 96.8 | 61.3 | 38.7 |
| 6 | 97.0 | 62.5 | 37.5 |
| 7 | 97.2 | 63.5 | 36.5 |
| 8 | 97.4 | 64.5 | 35.5 |
| 9 | 97.6 | 65.5 | 34.5 |
| 10 | 97.8 | 66.5 | 33.5 |
| 11 | 98.0 | 67.5 | 32.5 |
| 12 | 98.2 | 68.5 | 31.5 |
| 13 | 98.4 | 69.5 | 30.5 |
| 14 | 98.6 | 70.5 | 29.5 |
| 15 | 98.8 | 71.5 | 28.5 |
| 16 | 99.0 | 72.5 | 27.5 |
| 17 | 99.2 | 73.5 | 26.5 |
| 18 | 99.4 | 74.5 | 25.5 |
| 19 | 99.6 | 75.5 | 24.5 |
| 20 | 99.8 | 76.4 | 23.6 |
| 21 | 100.0 | 77.3 | 22.7 |
| 22 | 100.2 | 78.1 | 21.9 |
| 23 | 100.4 | 79.0 | 21.0 |
| 24 | 100.6 | 79.9 | 20.1 |
| 25 | 100.8 | 80.8 | 19.2 |
| 26 | 101.0 | 81.7 | 18.3 |
| 27 | 101.2 | 82.6 | 17.4 |
| 28 | 101.4 | 83.5 | 16.5 |
| 29 | 101.6 | 84.3 | 15.7 |
| 30 | 101.8 | 85.1 | 14.9 |
| 31 | 102.0 | 85.9 | 14.1 |
| 32 | 102.2 | 86.7 | 13.3 |
| 33 | 102.4 | 87.5 | 12.5 |
| 34 | 102.6 | 88.2 | 11.8 |
| 35 | 102.8 | 88.9 | 11.1 |
| 36 | 103.0 | 89.6 | 10.4 |
| 37 | 103.2 | 90.3 | 9.7 |
| 38 | 103.4 | 91.0 | 9.0 |
| 39 | 103.6 | 91.7 | 8.3 |
| 40 | 103.8 | 92.4 | 7.6 |
| 41 | 104.0 | 93.1 | 6.9 |
| 42 | 104.2 | 93.8 | 6.2 |
| 43 | 104.4 | 94.5 | 5.5 |
| 44 | 104.6 | 95.2 | 4.8 |
| 45 | 104.8 | 96.0 | 4.0 |

In general, compounds, particularly organic compounds, which have analogous chemical compositions (e.g., analogs, homologs and optical isomers), have substantially the same molecular volume or have similar crystalline structure (e.g., isomorphous) form solid solutions which are useful in providing detecting elements for temperature measurement. In addition, the solid solutions must have a linear or an essentially linear temperature-composition liquidous curve, particularly over the desired temperature range such as, in the example of FIG. 2, over the clinical temperature range. Further solid solutions of organic compounds, the components of which respond to one or more of the aforesaid criteria, include: l-menthol - dl-menthol; Acetophenone - Benzophenone; Dimethyl succinate - Dimethyl oxalate; 4-Chloropropiophenone - 4-Bromopropiophenone; 4-Chloro-2-methyl aniline - 4-Bromo-2-methyl aniline; 4-Chloroacetophenone - 4-Bromoacetophenone; n-Butyl sulfoxide - n-Butyl sulfone; n-Hexane - 2-Nonodecane; Cyclohexane - 2-Nonodecane; and alpha-Chlorocinnamaldehyde - alpha-Bromocinnamaldehyde.

Upon preparation of the environmental characteristic detector, it is subjected to an environment of interest. In this step, all of the detecting elements are simultaneously influenced. Each detecting element having a threshold level equal to or less than the characteristic magnitude of the environment will exhibit a detectable change of state. In the exemplary instance, and using the thermally-responsive compositions as set forth in the Table, the solid compositions 4 having melting points equal to or below body temperature are liquified. Accordingly, where body temperature is, e.g., 98.8°F., the compositions of 15 detecting elements undergo state change. In the detector of FIG. 2, layers 6 of all detecting elements of the uppermost three rows are wetted by liquification of the compositions 4 thereof and are thus changed in respect of, e.g., their capacities for absorbing and reflecting incident radiation.

After the detector is subjected to the environment, steps of sensing detector sensible indicia content, of counting sensed indicia and of generating a signal indicative of the count are performed. FIG. 1 illustrates a system adapted for automated performance of these steps.

The system of FIG. 1 includes a plurality of sensing units 10, 20, 30, 40 and 50, each having the structure indicated for channel 10, which provide output signals on lines 11, 21, 31, 41 and 51, respectively. These units are each adapted, by arranging elements thereof in sensing position relative to conveyor D (FIG. 2), to sense a selective plurality of detecting elements as the detector is conveyed through such sensing position. The conveying of a detector to such position is detected by entry sensing unit 60 which accordingly provides an output signal on line 61.

The output lines of the sensing units terminate individually in resettable counters 12, 22, 32, 42 and 52, entry sensing unit output line 61 being connected to each of the counters for resetting the same to zero count before each detector enters the sensing position. The counters are conventional binary counters, the binary coded decimal (BCD) output signals of which are applied to output conductors 13, 23, 33, 43 and 53, each comprised of a plurality of lines as dicussed in connection with FIG. 4. These output conductors terminate in accumulator-generator 70 which is illustrated in detail in FIG. 4 and discussed below. Briefly, unit 70 is adapted to provide binary signals indicative of the number of sensible indicia contained in the detector examined by the system of FIG. 1.

Sensor 10 incorporates a pair of sensors, 14a and 14b, e.g., phototransistors. Lamp L is associated with the sensors as is a light directing member comprised of channels A, B and C. Channel C is juxtaposed with one of the aforesaid five columns of detecting elements and light from lamp L is conducted to channel C from channel B. Light reflected from the detector is conducted through channels C and A to sensor 14a. Sensor 14b is exposed continualty to light from lamp L. The light directing member is preferably comprised of a bifurcated optic fiber. As the detector is advanced past channel C, or as this channel is moved relative to the carrier sheet, signals are generated by reflectance (or absorption) of said applied light energy in respect of each of the detecting elements. Considering sensing unit 10, and assuming the same to be associated with the decimal part zero (0.0) column of FIG. 2, sensor 14a may see, in the order of decreasing magnitude, anyone of three reflectances of applied light, namely, (1) from highly reflective bare carrier sheet 5 surface, (2) from detecting elements which have not undergone state change and whose layers 6 are thus highly reflective, and (3) from detecting elements which have undergone state change and whose layers 6 have limited reflectivity. Sensor 14a thus applies to bridge circuit 14c, signals having magnitudes according with said light reflectances. Differential amplifier 15 differences such signals of sensor 14a with the constant signal from sensor 14b, also conducted through the bridge circuit, and provides output signals to comparator 16, having magnitudes inversely correlating with the abovediscussed amplitude order. Comparator 16 compares such applied signals with a predetermined reference magnitude established by reference generator 17, e.g., as provided by the wiper arm of an excited potentiometer, and indicative of the minimum level defining sensible indicia. Exclusively where an applied signal magnitude exceeds such reference magnitude, the comparator applies an output pulse through pulse shaper 18 to output line 11. Evidently, where each of the nine detecting elements of the thermometer column sensed by unit 10 has undergone state change and provides a sensible indicium, a succession of nine pulses is provided on output line 11. Sensing units 20, 30, 40 and 50 operate in identical manner to channel 10 and incorporate identical structure.

Figure 2:
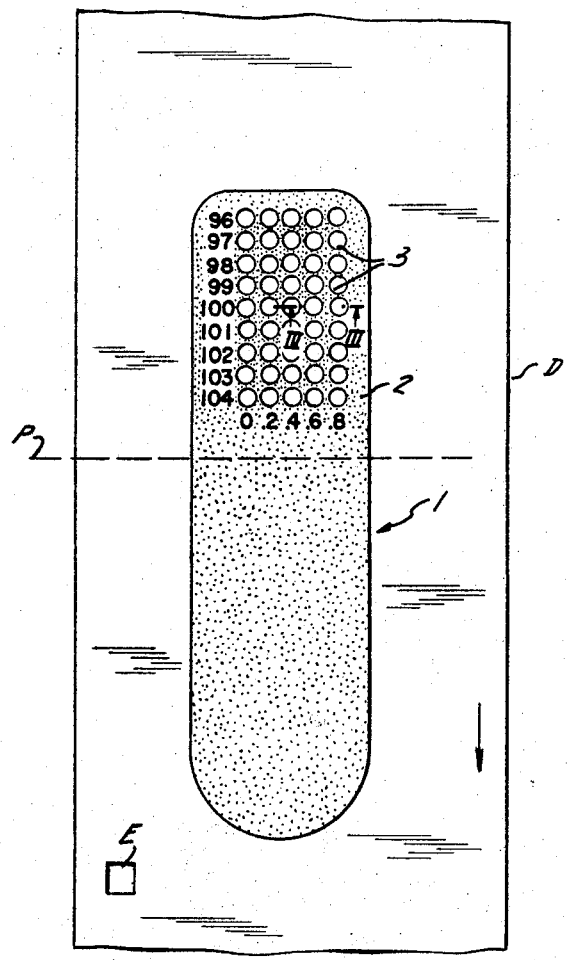
FIG. 2 is a plan view of a typical environmental characteristic detector adapted for use in the invention.

With conveyor D moving in the direction indicated by the arrow in FIG. 2, i.e., toward sensing position P, and with entry detecting sensor 62, or its energy collector, juxtaposed with the left-hand marginal edge of the conveyor, sensor 62 is energized as aperture E moves past the sensor. The sensor output, as shaped by pulse shaper 63, is applied through line 61 to the counters 12–52, which are thereby reset to zero count. As the detector is thus moved into and through sensing position P, sensible indicia count pulses are generated, as discussed immediately above.

Counters 12–52 may typically comprise MSI TTL High-Speed Decade Counters, Circuit Type SN 7490N manufactured by Texas Instruments, Incorporated, or like binary-coded-decimal counters having at least an input terminal and a reset terminal and adapted to provide a count inclusive of the maximum number of input pulses which might occur prior to reset. The counter output conductors individually comprise four output lines, denoted by the reference numerals 13a–13d through 53a–53d in FIG. 4. Line 13a indicates an eight count, line 13b a four count, line 13c a two count, and line 13d a one count. The exemplary maximum number of input pulses occurring prior to resetting the counters is nine, and the counter will indicate the same by providing lines 13a and 13d with positive potential (logical ONE) and lines 13c and 13b with a D.C. ground (logical ZERO).

Figure 4:
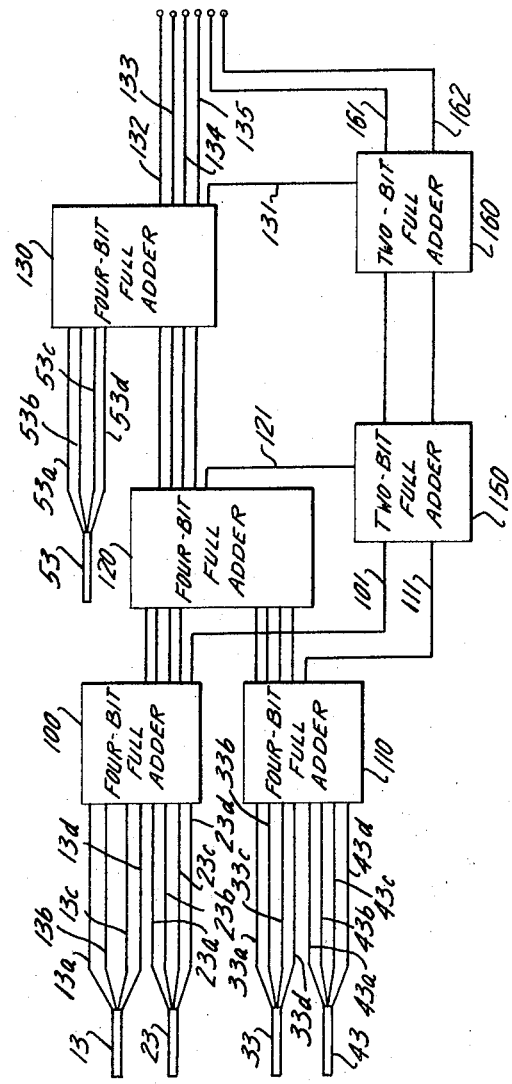
FIG. 4 is a schematic drawing of a preferred embodiment of the accumulator-indicator of FIG. 1.

Referring to FIG. 4, accumulator-generator 70 performs a summation of information derived from all of counters 12–52 in respect of the examined detector and provides output signals indicative of such summation. Four-bit full adder 100 receives information from lines 13a–d and 23a–d, thereby summing the contents of counters 12 and 22. Four-Bit full adder 110 performs a summation of the contents of counters 32 and 42 by receipt of information from lines 33a–d and lines 43a–d. In use of commercially available circuit elements discussed below, four-bit full adders 100 and 110 provide carry signals ($2^4$) respectively on lines 101 and 111 and apply their non-carry output information up to a maximum sum of $2^4-1$ to four-bit full adder 120. This full adder provides its carry signal ($2^4$) on line 121 and its non-carry information ($2^4-1$) is applied to four-bit full adder 130. Adder 130 performs a summation of such composite non-carry information ($2^4-1$) from counters 12, 22, 32 and 42 and the contents of counter 52 derived through lines 53a–d. The resultant non-carry information ($2^4-1$) in respect of all of counters 12–52 is provided on lines 132–135.

The carry information of four-bit full adders 100, 110 and 120 is applied to two-bit full adder 150, the output of which is applied in conjunction with the carry information of adder 130 to two-bit full adder 160. This full adder provides its output information ($2^4$, $2^5$) on lines 161 and 162. As will be evident, the decimal capacity of lines 132–135 and 161–162 is $2^6-1$ (sixty-three), since six input lines are provided. Such capacity is inclusive of the maximum number of elements of the detector of the illustrative example, namely, 45.

The above four-bit full adders 100, 110, 120 and 130 may readily comprise Adders SN 7483N and the two-bit full adders may be Adders SN 7482N, both available from the aforementioned manufacturer.

Figure 3:
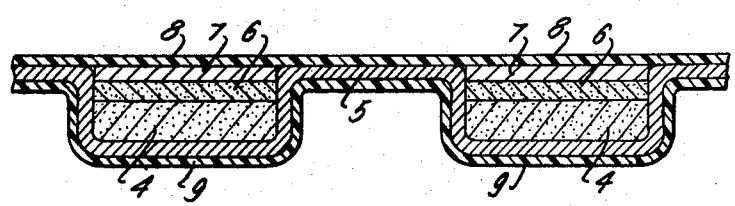
FIG. 3 is a cross-sectional view of the detector of FIG. 2 taken along the lines II—II of FIG. 2.

By way of example of the overall operation of the system of FIGS. 1 and 4, let it be assumed that the detector of FIGS. 2–3 is subjected to a body temperature of 98.8°F. As above discussed, the detecting elements of the uppermost three rows of the detector each undergo a change of state in response to such environmental characteristic magnitude. When the detector is conveyed past sensing units 10–50, each generates three pulses (ONES) and applies the same to its associated one of counters 12–52. Counter output lines 13c, 13d, 23c, 23d, 33c, 33d, 43c, 43d, 53c and 53d accordingly receive output signals (ONES) whereas all remaining lines 13–53 are unenergized (ZERO). In its summation of these applied signals, unit 70 provides output signals (ONES) on lines 131–135 and retains lines 161 and 162 at ZERO. This pulse pattern, 001111, is a binary signal comprised of $2^3+2^2+2^1+2^0$ and indicative of decimal 15, which correlates, through the preselected numeric scale, with the temperature 98.8°F.

In use of the signals generated on lines 132–135, 161 and 162, the lines may be connected in parallel to a serializing buffer which may be clocked to generate a serial pulse train. Alternatively, the signals may be applied to a decoding indicator, or simply recorded for future use.

In the exemplary instance, sensible indicia are derived by use of a readily detectable color change in layer 6, e.g., from white (highly reflective) to a less reflective color. Resolution of sensible indicia may be evidently improved by use of monochromatic light. Of course, sensible indicia may be derived in this particular instance without visual or color change by like reflectance-absorption phenomena.

The grid arrangement of the detecting elements of FIG. 2, i.e., row and column with elements in the order of succeeding magnitudes, provides convenience in practicing the sensing step. Thus, sensing time is reduced since selective groups (five) of detecting elements are simultaneously scanned. Also, where visual color change is incorporated, the detector output, in non-binary signal form, may be observed where desired to provide a ready basis for error-checking. On the other hand, the invention may of course be practiced where the detecting elements are dispersed in random fashion and are scanned individually. In the described temperature detector, resolution is 0.2°F. This matter is determined strictly by choice of environmental-responsive composition of the detecting elements and may be readily varied.

While preferred counter and accumulator-generator circuitry is shown in FIGS. 1 and 4, the same is not requisite but derives from the group sensing concept above-discussed. Where scanning of individual detecting elements for sensible indicia is practiced, a singl counter with appropriate capacity may receive and totalize all signals indicative of sensible indicia and provide the desired output putlse pattern.

Since the foregoing and other changes and modifications to the invention will be evident to those skilled in the art, the particularly illustrated embodiments are intended in a descriptive and not in a limiting sense. The true spirit and scope of the invention is indicated in the following claims.

What is claimed is:

1. A method for generating electrical signals indicative of data concerning an environmental characteristic, comprising the steps of:
   a. preselecting a numerical scale of $n$, $n-1$, ... $n-k$ digits each defining a distinct magnitude in a succession of $n$, $n-1$, ... $n-k$ discrete magnitudes of said environmental characteristic;
   b. providing a detector by arranging on a common support a corresponding succession of $n$, $n-1$, ... $n-k$ detecting elements, each detecting element in said succession having a distinct threshold level for detecting environmental characteristic magnitude, said threshold level of each detecting element being equal to the characteristic magnitude defined by the corresponding digit of said preselected scale, each detecting element being provided by arranging on said support, means providing a sensible indicium upon being subjected to a first environment having characteristic magnitude equal to or greater than the threshold level of such detecting element and thereafter maintaining such sensible indicium provision upon being subjected to other environments having characteristic magnitude lesser than said threshold level of such detecting element;
   c. subjecting said detector to such first environment and, after removing said detector from said first environment, counting exclusively the sensible indicia provided by the detector; and
   d. generating an electrical signal indicative of said sensible indicia count.

2. A method for generating electrical signals indicative of data concerning an environmental characteristic, comprising the steps of:
   a. preselecting a numerical scale of $n$, $n-1$, ... $n-k$ digits each defining a distinct magnitude in a succession of $n$, $n-1$, ... $n-k$ discrete magnitudes of said environmental characteristic;
   b. providing a detector by arranging on a common support a corresponding succession of $n$, $n-1$, ... $n-k$ detecting elements, each detecting element in said succession having a distinct threshold level for detecting environmental characteristic magnitude, said threshold level of each detecting element being equal to the characteristic magnitude defined by the corresponding digit of said preselected scale, each detecting element being provided by arranging on said support, in overlying relation, a first member exhibiting a change in state upon being subjected to an environment having characteristic magnitude equal to or greater than the threshold level of such detecting element and a second member operative to provide a sensible indicium upon occurrence of said first member state change;
   c. subjecting all of said detecting elements to an environment;
   d. sensing said detector to determine all sensible indicia therein;
   e. generating a first signal for each sensed sensible indicium;
   f. counting said first signals; and
   g. generating a second signal indicative of said count.

3. The method claimed in claim 2 wherein said detecting elements are spacedly disposed on a continuous substrate, said first and second members being disposed in cavities formed in said substrate, said second member overlying said first member.

4. The method claimed in claim 3 wherein said detecting elements are disposed in grid format on said substrate and wherein said step of detector sensing is practiced by simultaneously sensing multiple detecting elements disposed in a common line of said grid.

5. The method claimed in claim 2 wherein said step of sensing said sensible indicia is practiced by irradiating all of said detecting elements, then generating output signals indicative of the amplitudes of radiation reflected from irradiated detecting elements and then comparing each of said output signals with a common reference signal.

6. The method claimed in claim 5 wherein said first signals are generated for each comparison involving an output signal of amplitude greater than said reference signal.

7. A system for generating signals indicative of data concerning an environmental characteristic comprising:
   a. detector means including a plurality of detecting elements arranged on a common support, each detecting element having a distinct threshold level for detecting environmental characteristic magnitude and comprising in overlying relation, a first member exhibiting a change in state upon being subjected to an environment having characteristic magnitude of at least said level and a second member operative to provide a sensible indicium upon occurrence of said first member state change;
   b. first circuit means for sensing said detecting elements and generating an output signal for each sensed detecting element providing a sensible indicium; and c. second circuit means for counting said first circuit means output signals and generating a signal indicative of said count, said count-indicative signals constituting said system-generated signals.

8. The system claimed in claim 7 wherein said first circuit means comprises sensor means generating signals indicative of detector means characteristics, reference generator means generating a signal indicative of a predetermined detector means characteristic and a signal comparator receiving said sensor means and reference generator signals and generating said first means output pulses.

9. The system claimed in claim 8 wherein said sensor means comprises a source irradiating said detector means, a first sensor element exposed to said irradiated detector means, a second sensor element exposed to said soruce and a differential amplifier connected to said sensor elements and providing said sensor means signals.

10. The system claimed in claim 9 further including means for conveying said detector means for said exposure thereof to said first sensor element and signal generator means operatively responsive to said conveying means to generate a signal for resetting of said second circuit means to zero count.

* * * * *